United States Patent Office 2,782,096
Patented Feb. 19, 1957

2,782,096

AMMONIUM NITRATE OF REDUCED TENDENCY TO CAKING AND SETTING ON STORAGE

Jack Ames, Ardrossan, Scotland, assignor to Imperial Chemical Industries Limited, a corporation of Great Britain No Drawing. Application April 19, 1954,
Serial No. 424,279

Claims priority, application Great Britain June 1, 1953

11 Claims. (Cl. 23—103)

The present invention is concerned with a method of lowering the tendency towards caking and setting of ammonium nitrate and with providing ammonium nitrate having a greatly reduced tendency towards caking and setting to a hard mass on storage. The invention is also concerned with solid ammonium nitrate products which include said ammonium nitrate having a greatly reduced tendency towards caking and setting.

Ammonium nitrate is an intensely hygroscopic compound and its tendency to cake and set on storage, which is believed to be due to the formation of crystalline bridges from a saturated solution which is formed between adjacent particles of ammonium nitrate on absorption of moisture and which crystallises when changes occur in atmospheric conditions, is an extreme inconvenience in the handling of ammonium ntrate whether in bulk or in bags or in its use in explosives.

It is known that when ammonium nitrate is provided with a thin surface coating of certain aromatic dyestuffs, as for example by crystallisation from an aqueous solution containing said dyestuff in solution, the resulting ammonium nitrate at least in the crystal form IV exhibits a greatly reduced tendency to caking and setting, and ammonium nitrate treated with e. g. the ammonium or calcium salt of tri-sulphonated para-para-para-triamino-tritolyl carbinol anhydride (i. e. the ammonium or calcium salt of tri-sulphonated New Magenta) has been used successfully in preventing the caking and setting of ammonium nitrate used for the production of explosive compositions. This dyestuff, as its name implies, is of a magenta colour. Although only a very small proportion of this dyestuff and the other sulphonated aromatic dyestuffs whose employment has been proposed is required the resulting ammonium nitrate has an intense colour.

For certain purposes the presence of said colour is undesirable, and it is an object of the invention to provide ammonium nitrate of reduced caking and setting properties having its normal white appearance.

Among the dyestuffs aforementioned it was noted that a large number of sulphonated mono-azo-naphthalene dyestuffs were effective as crystal habit modifiers and it was thus considered that a colourless compound definable as a condensation product of 1 mol. of formaldehyde and 2 mols. of a naphthalene monosulphonic acid wherein the methylene group replaces the chromophoric azo group might have comparable crystal habit modifying properties for ammonium nitrate without the accompanying disadvantages of colour.

According to the present invention ammonium nitrate of reduced tendency to caking and setting on storage consists of discrete ammonium nitrate particles carrying on their surfaces a deposit comprising a salt soluble in a saturated aqueous ammonium nitrate solution at 20° C. of at least one compound definable as a condensation product of 1 mol. of formaldehyde and 2 mols. of a naphthalene monosulphonic acid.

According to the present invention the method for the production of ammonium nitrate of reduced tendency to caking and setting on storage comprises effecting crystallisation of an aqueous solution of ammonium nitrate containing, reckoned on the weight of the dry ammonium nitrate particles, from 0.01% of a salt soluble in a saturated aqueous ammonium nitrate solution at 20° C. of at least one compound definable as a condensation product of 1 mol. of formaldehyde and 2 mols. of a naphthalene monosulphonic acid.

Alternatively according to the invention the method for the production of ammonium nitrate of reduced tendency to caking and setting on storage comprises spraying an aqueous solution of a salt soluble in a saturated ammonium nitrate solution at 20° C. of at least one compound definable as a condensation product of 1 mol. of formaldehyde and 2 mols. of a naphthalene monosulphonic acid over the surfaces of previously formed ammonium nitrate particles.

It is assumed that in said compound which is a disulphonic acid of a dinaphthylmethane the sulphonic acid groups are in the rings to which the methylene group is not attached and are in one of the $\alpha$ positions in one naphthyl group and in one of the $\alpha$ positions in the other naphthyl group or in one of the $\beta$ positions in one naphthyl group and in one of the $\beta$ positions in the other naphthyl group or in one of the $\alpha$ positions in one naphthyl group and in one of the $\beta$ positions in the other naphthyl group depending upon whether naphthalene-$\alpha$-sulphonic acid, naphthalene-$\beta$-sulphonic acid, or an equimolecular mixture of these is reacted with formaldehyde or its equivalent, preferably in the presence of sulphuric acid or hydrochloric acid, as for example in accordance with the method described in Canadian specification No. 347,865 or U. S. specification No. 2,046,757.

Since as indicated in said Canadian and U. S. specifications the precise position of the methylene group in the resulting disulphonic acids has not yet been ascertained with certainty it is not strictly correct to define a disulphonic acid of a dinaphythylmethane used in the form of a soluble salt to carry out the invention by referring to the $\alpha:\alpha'$, $\beta:\beta'$ or $\alpha:\beta'$ positions for the purpose of locating the sulphonic acid groups in the two naphthyl groups. Nevertheless, for convenience hereinafter the disulphonic acids of dinaphthylmethane will be referred to as $\alpha:\alpha'$, $\beta:\beta'$ or $\alpha:\beta$-disulphonic acids of dinaphthylmethane according to whether the compound is derived respectively by reacting with formaldehyde or its equivalent naphthalene-$\alpha$-sulphonic acid, naphthalene-$\beta$-sulphonic acid, or an equimolecular mixture of these two naphthalenesulphonic acids.

Whereas ammonium nitrate IV normally crystallises from saturated solution as {110} prisms or needles, the presence of small concentrations of the aforesaid salts of disulphonic acids of dinaphthylmethane in the crystallising solution results in the formation of laths, plates, or scale showing {010} faces. These modified crystals are of reduced mechanical strength, and thus it is assumed that the strength of the bridges of recrystallised material which form between adjacent particles of ammonium nitrate in the presence of said salts is reduced. It is observed that the $\beta:\beta'$ isomer exerts a somewhat greater effect on the prevention of setting than the $\alpha:\alpha'$ and $\alpha:\beta'$ isomers.

The effect of the salts of said disulphonic acids of dinaphthylmethane is quite different in kind from the effect of conventional dusting agents, whether or not possessed of hydrophilic or hydrophobic properties, not only because the salts used according to the invention modify the crystal habit of the ammonium nitrate, but also because they are effective in such smaller amounts, both under ordinary storage conditions and when exposed to abnormally humid atmospheres and their effect is much more lasting.

Quantities of the soluble salts of the aforesaid disulphonic acids of dinaphthylmethane from at least approximately 0.01% reckoned on the weight of the dry ammonium nitrate particles are effective, but it is preferred to employ from 0.025% and the invention may be put into effect by dissolving the soluble salt of the aforesaid disulphonic acid of dinaphthylmethane in the aqueous solution or aqueous melt from which the ammonium nitrate is obtained in solid form, e. g. by graining or spray crystallisation. In crystallising out, the interior of the ammonium nitrate solid particles remains substantially free from the compound, and it is the evaporation of the adhering mother liquor which deposits the thin coating on the crystals.

Another method of application of the aforesaid salt is to dissolve it in water and spray the resulting solution over the surfaces of the previously formed ammonium nitrate particles, and bring about the evaporation of the water while keeping the ammonium nitrate particles in motion.

The reduction of caking and setting is exhibited effectively only in the crystalline form of ammonium nitrate stable at temperatures from −18 to 32.3°, namely ammonium nitrate IV, and as will be understood, the solid ammonium nitrate particles will usually be encountered in this form.

In most manufacturing processes, however, the solid ammonium nitrate particles will usually be first obtained at a temperature exceeding 32.3° C., and it is essential that the particles be continuously agitated until the temperature falls below 32.3° C. or until the residual moisture is driven off. The ammonium nitrate so treated must be stored at a temperature not exceeding 32.3° C.

The following examples illustrate how ammonium nitrate according to the invention can be produced. The parts are parts by weight.

*Example 1*

The sodium salt of $\beta:\beta'$-disulphonic acid of dinaphthylmethane is prepared by heating under gentle reflux for 24 hours a mixture of 8.3 parts by weight of $\beta$-naphthalenesulphonic acid, 1.9 parts by weight of an aqueous solution of formaldehyde (37% w./v.) and 1.9 parts by weight of sulphuric acid (s. g. 1.84) in 10 parts by weight of water and neutralising the resulting liquor with a sodium hydroxide solution.

The surfaces of ammonium nitrate granules produced by a spray crystallisation process of particle size 30 to 100 B. S. S. are treated while still hot with a 10% aqueous solution of the sodium salt of said $\beta:\beta'$-disulphonic acid of dinaphthylmethane, in an amount such that the ammonium nitrate will acquire a surface coating of 0.05% of the said salt. The granules are dried with mechanical agitation. The dry product preserves the original form and white appearance of the granules and is free running and resistant to setting for at least nine months when stored indoors in cardboard containers with loosely fitting lids.

*Example 2*

Ammonium nitrate is crystallised by cooling to 20° C. from aqueous solution with vigorous stirring in the presence of 0.1% of the sodium salt of $\beta:\beta'$-disulphonic acid of dinaphthylmethane as prepared in Example 1, so as to give very small crystals. These crystals are separated from their mother liquor and are dried and repulverised. The product is white in appearance and is resistant to setting for at least several weeks when stored as in Example 1.

*Example 3*

Ammonium nitrate, in the form of a 95% aqueous solution at an elevated temperature, is crystallised in the presence of 0.1% of the sodium salt of $\beta:\beta'$-disulphonic acid of dinaphthylmethane as prepared in Example 1 in a graining kettle or other mechanical mixing apparatus, so that the heats of transition and crystallisation of the ammonium nitrate serve to evaporate the water. When cooled to ordinary temperature while the machine is still running a dry crystalline powder white in appearance and resistant to setting for several weeks when stored as in Example 1 is obtained.

*Example 4*

The sodium salt of $\alpha:\alpha'$-disulphonic acid of dinaphthylmethane is prepared by heating under gentle reflux for 24 hours a mixture of 8.5 parts by weight of $\alpha$-naphthalenesulphonic acid, 2.0 parts by weight of an aqueous solution of formaldehyde (37% w./v.) and 2.7 parts by weight of sulphuric acid (s. g. 1.84) in 10 parts by weight of water and neutralising the resulting liquor with a sodium hydroxide solution.

The procedure is the same as in Example 1, except that the said sodium salt of $\alpha:\alpha'$-disulphonic acid of dinaphthylmethane is used in place of the $\beta:\beta'$ isomer. The dry white product so obtained, though not so free running as that obtained in Example 1, nevertheless shows marked resistance to setting in that it is easily shaken free after storage for 9 months in a lightly stoppered bottle.

*Example 5*

The sodium salt of $\alpha:\beta'$-disulphonic acid of dinaphthylmethane is prepared by heating under gentle reflux for 24 hours a mixture of 20.8 parts by weight of $\alpha$-naphthalenesulphonic acid, 20.8 parts by weight of $\beta$-naphthalenesulphonic acid, 11.0 parts by weight of aqueous formaldehyde solution (37% w./v.) and 12.5 parts by weight of sulphuric acid (s. g. 1.84), in 44 parts by weight of water and neutralising the resulting liquor with a sodium hydroxide solution.

The procedure is the same as for Example 2, except that the sodium salt of said $\alpha:\beta'$-disulphonic acid of dinaphthylmethane is used in place of the $\beta:\beta'$ isomer. Aggregates of thin scales and plates showing {010} faces are obtained on slow cooling of a 1% solution in saturated ammonium nitrate solution, and with 0.1% coating of the agent the dried product shows improved resistance to setting.

What I claim is:

1. Ammonium nitrate of reduced tendency to caking and setting on storage comprising discrete ammonium nitrate particles carrying on their surfaces a deposit of at least one salt of an acid selected from the group consisting of the $\alpha:\alpha'$, $\beta:\beta'$ and $\alpha:\beta'$ disulphonic acids of dinaphthylmethanes, said salt being soluble in a saturated aqueous ammonium nitrate solution at 20° C.

2. Ammonium nitrate as claimed in claim 1 wherein the quantity of the soluble salt of the aforesaid disulphonic acids of dinaphthylmethane is at least approximately 0.01% reckoned on the weight of the dry ammonium nitrate particles.

3. Ammonium nitrate as claimed in claim 2 wherein the quantity of the said soluble salt is from 0.025%.

4. Ammonium nitrate according to claim 1 wherein the $\alpha:\alpha'$-disulphonic acid is the condensation product of formaldehyde and naphthalene-$\alpha$-disulphonic acid.

5. Ammonium nitrate according to claim 1 wherein the $\beta:\beta'$-disulphonic acid is the condensation product of formaldehyde and naphthalene-$\beta$-sulphonic acid.

6. Ammonium nitrate according to claim 1 wherein the $\alpha:\beta$-disulphonic acid is the condensation product of formaldehyde and an equimolecular mixture of naphthalene-$\alpha$-sulphonic acid and naphthalene-$\beta$-sulphonic acid.

7. A method for the production of ammonium nitrate of reduced tendency to caking and setting on storage which comprises effecting crystallisation of an aqueous solution of ammonium nitrate containing, reckoned on the weight of the dry ammonium nitrate particles, from 0.01% of at least one salt of an acid selected from the group consisting of the $\alpha:\alpha'$, $\beta:\beta'$ and $\alpha:\beta'$ disulphonic acids of dinaphthylmethanes, said salt being soluble in a saturated aqueous ammonium nitrate solution at 20° C.

8. A method as claimed in claim 7 which comprises effecting the direct crystallisation of the aqueous solution of ammonium nitrate containing the said salt.

9. A method as claimed in claim 7 which comprises effecting the granulation of an aqueous solution of ammonium nitrate containing the said salt.

10. A method as claimed in claim 7 in which the aqueous solution of ammonium nitrate containing the said salt is crystallised by spraying.

11. A method for the production of ammonium nitrate of reduced tendency to caking and setting on storage which comprises spraying an aqueous solution of at least one salt of an acid selected from the group consisting of the $\alpha:\alpha'$, $\beta:\beta'$ and $\alpha:\beta'$ disulphonic acids of dinaphthylmethanes, said salt being soluble in a saturated aqueous ammonium nitrate solution at 20° C. over the surfaces of previously formed ammonium nitrate particles.

References Cited in the file of this patent

UNITED STATES PATENTS

| | | |
|---|---|---|
| 2,616,786 | Whetstone | Nov. 4, 1952 |
| 2,616,787 | Whetstone | Nov. 4, 1952 |